United States Patent [19]

Fuller

[11] 4,136,994
[45] Jan. 30, 1979

[54] FLOATING BREAKWATER

[76] Inventor: Richard B. Fuller, 200 Locust St., Apt. 31B, Philadelphia, Pa. 19106

[21] Appl. No.: 834,249

[22] Filed: Sep. 19, 1977

[51] Int. Cl.² .............................................. E02B 3/06
[52] U.S. Cl. ....................................... 405/27; 405/63
[58] Field of Search ................... 61/1 F, 1 R, 4, 5, 20

[56] References Cited

U.S. PATENT DOCUMENTS

| 1,507,461 | 9/1924 | Chase | 61/20 |
|---|---|---|---|
| 3,584,462 | 6/1971 | Gadd | 61/1 F |
| 3,590,584 | 7/1971 | Fitzgerald et al. | 61/1 F |
| 3,863,455 | 2/1975 | Fuller | 61/5 |
| 3,969,901 | 7/1976 | Matsudaira et al. | 61/5 |
| 4,023,370 | 5/1977 | Watson | 61/5 |

Primary Examiner—Mervin Stein
Assistant Examiner—David H. Corbin
Attorney, Agent, or Firm—Parmelee, Johnson, Bollinger & Bramblett

[57] ABSTRACT

In a floatable breakwater, one or more flexible membranes are suspended below a floatable, open grid. An outer membrane is formed into a trough. Inner membrane components serve to define multiple ports and reduce the energy of the wave as water is moved and churned through the various ports. The inner membrane components may have a truncated tetrahedral configuration. A turbine may be positioned at one end of the breakwater to utilize the wave energy.

19 Claims, 9 Drawing Figures

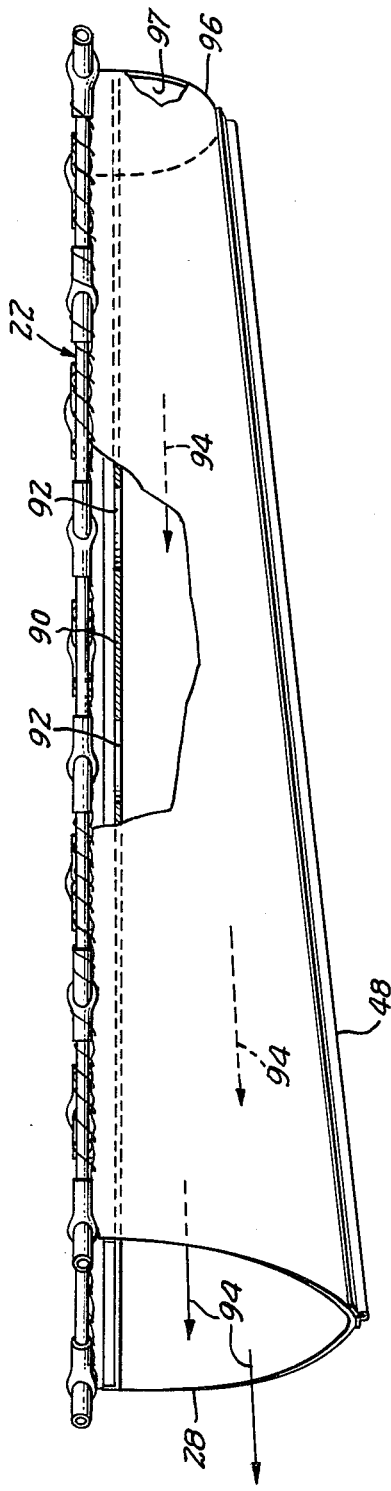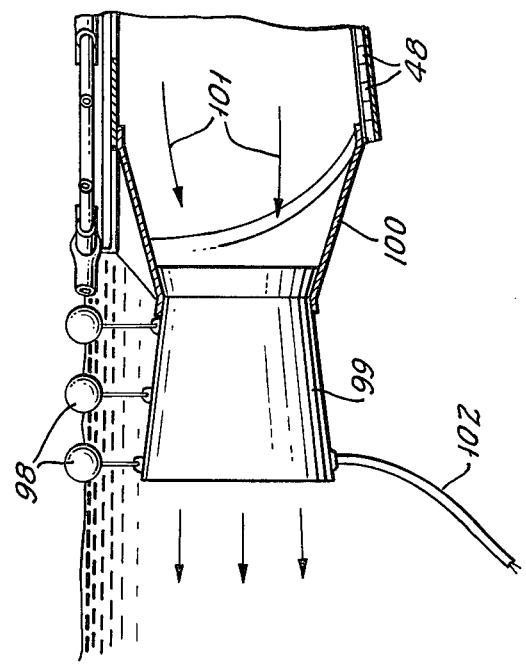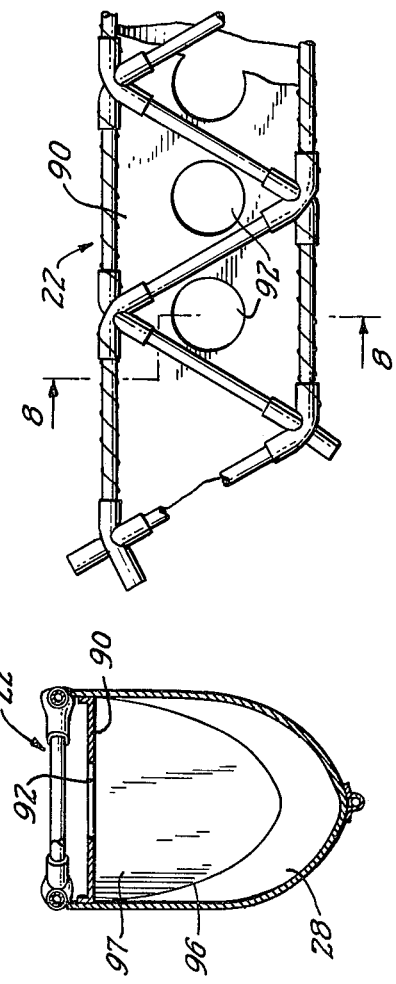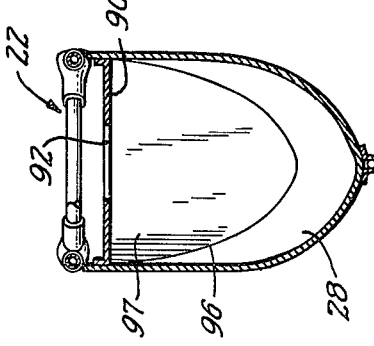

FLOATING BREAKWATER

DESCRIPTION

This invention relates to breakwaters and more particularly to breakwaters of the floatable type.

The use of breakwaters to dissipate wave energy and to thus protect shorelines is well known. Although past breakwaters are generally solid structures, portable breakwaters are also known. Of the portable breakwaters, the most efficient, in terms of effective use of materials and ease of transport, are those which are floatable and use the action of the wave to dissipate itself. An example of such a breakwater is found in my prior U.S. Pat. No. 3,863,455. In that patent, I disclosed a flexible tubular breakwater which floats at the water surface. A wave lifts the tubular structure as well as water therein and causes a flow of water within the tube. The energy required to lift and to move the water within the tube is supplied by the wave, and thus the energy of the wave is dissipated and reduced.

An object of this invention is to provide a portable breakwater which makes efficient use of materials.

A further object is to provide a breakwater which is easily transported, assembled and installed.

Yet another object of this invention is to provide a portable breakwater which effectively dissipates wave energy by churning water contained therein through internal ports.

A still further object of this invention is to provide a breakwater which is adaptable for use with a turbine to generate usable power from the wave energy.

According to the present invention in one of its aspects, a floatable breakwater comprises a floatable open grid with a troughlike membrane suspended below the grid. Inner membrane components which are also suspended from the floatable grid serve to define various ports or apertures through which the water is moved and churned as the breakwater is lifted by a passing wave and thereby dissipate energy from the wave.

According to other aspects of the invention, these inner membrane components may have a truncated tetrahedral configuration converging downwardly in the manner of multiple funnels such that water contained within the respective tetrahedron is ejected downwardly into the outer troughlike membrane when each passing wave momentarily elevates the breakwater.

In accordance with the present invention in certain of its aspects, a turbine may be positioned at one end of the breakwater for converting the energy of the longitudinal flow of water out of the end of the troughlike membrane into electric power.

BRIEF DESCRIPTION OF THE DRAWINGS

The foregoing and other objects, features, and advantages of the invention will become more fully understood from the following description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 is an isometric view, partially broken away, of yet another embodiment of the invention;

FIG. 7 is a plan view of the embodiment of FIG. 6;

FIG. 8 is a sectional view of the embodiment of FIGS. 6 and 7 taken along lines 8—8 in FIG. 7;

FIG. 9 is a side view, partially in section, of the embodiment of FIG. 6 having a turbine positioned at one end for utilizing the longitudinal flow of water out of this end of the breakwater.

DESCRIPTION OF PREFERRED EMBODIMENTS OF THE INVENTION

Figure 1:
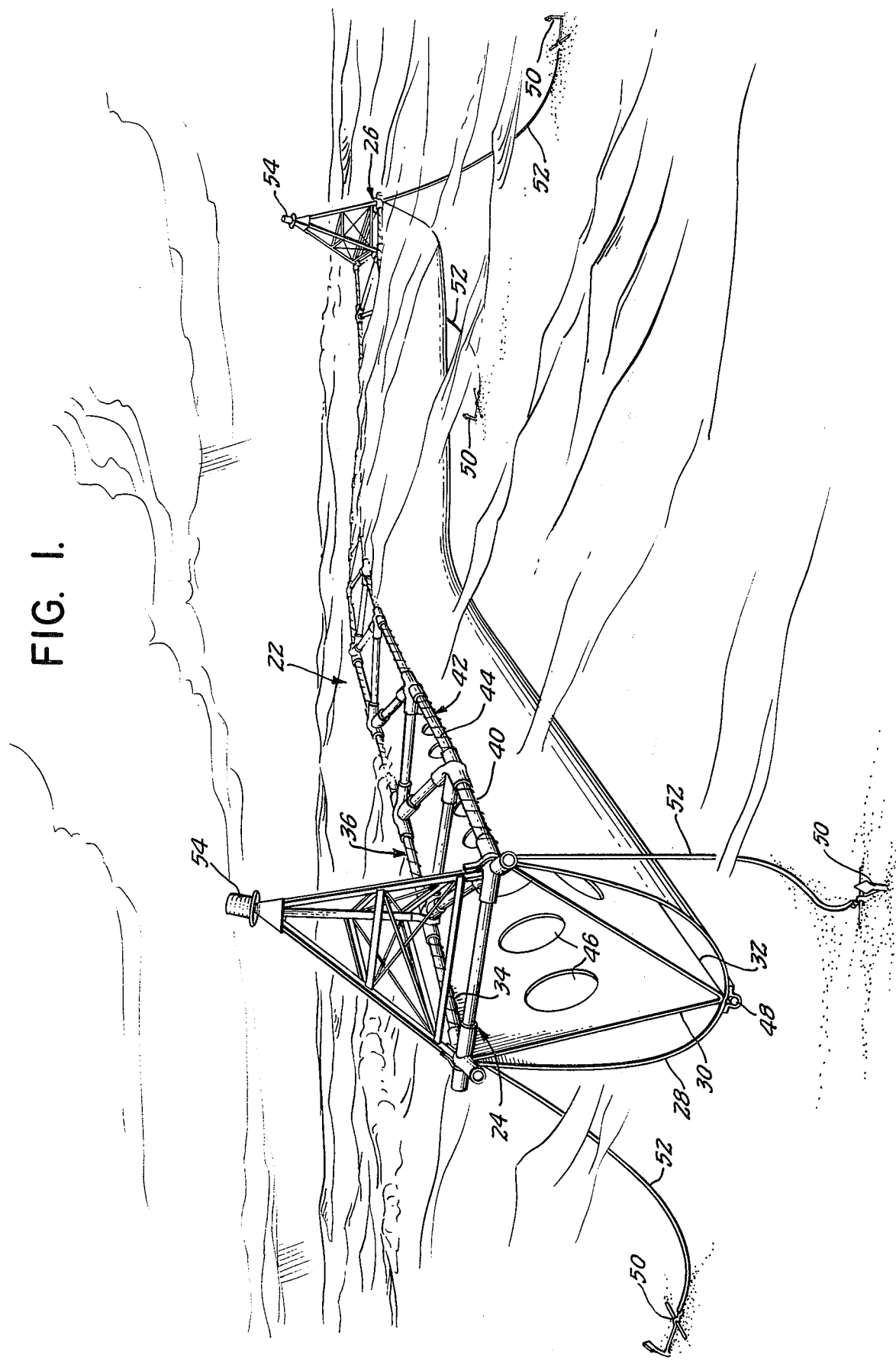
FIG. 1 is a perspective view of a preferred embodiment of the floating breakwater of this invention.

Referring to FIG. 1, the breakwater comprises a floating grid structure 22 having ends 24 and 26. Additional grid structures may be added on to either or both ends 24 and 26 to extend the breakwater.

A first flexible generally U-shaped membrane 28 is suspended below the floatable grid structure 22, and a second inner flexible membrane 30 is suspended below the grid structure within the first membrane. These two membranes 28 and 30 are joined along a line 32 which extends along the center bottom of the breakwater. They may be joined continuously along this line 32 or at selected points spaced therealong. The upper edges 34 of the membranes 28 and 30 are secured to a membrane support portion 36 of the grid structure which extends longitudinally along a first side of the breakwater between its ends 24 and 26. The other upper edges 40 of these membranes are secured to a second support portion 42 of the grid structure extending longitudinally along the second side of the breakwater. The membranes are secured to these support portions of the grid 22 by binding lines 44 which are shown helically wrapped around the respective support portions.

The second membrane 30 is perforated with holes 46 shown as ports spaced therealong to permit flow of water therethrough. A line of weights 48 extends the length of the membranes. This line of weights 48 is located along the center bottom of the breakwater in the manner of a keel weight and, by weighting down both membranes 28 and 30, retains them in the breakwater configuration shown. Because the surface width of membrane 30 is substantially less than the width of membrane 28, membrane 30 is pulled taut by weights 48 into a V-shape while membrane 28 assumes a more relaxed position defining a generally U-shaped trough.

The breakwater is moored in position by anchors 50 fixed to the breakwater by anchor lines 52 which are long enough to permit some movement of the breakwater. Lightweight towers with warning lights 54 ward off any boats in the area.

Figure 2:
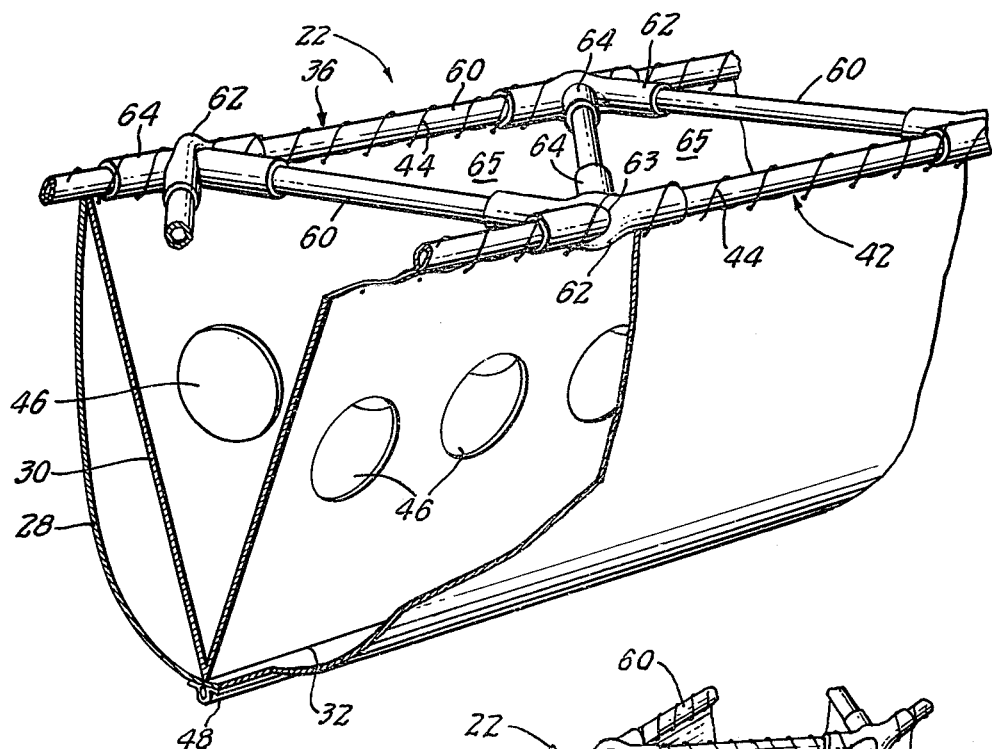
FIG. 2 is a perspective view of a section of the breakwater of FIG. 1, partially broken away.

The grid structure 22 is best shown in FIG. 2. The grid comprises a plurality of rigid tubular floatation segments 60 which are hingedly connected at their ends to form a line of alternately inverted equilateral triangles. These rigid segments 60 are shown as being each of the same length and serve as floatable booms. At each nodal point, four of these segments 60 are joined by two flexible sleeve-like connectors 62 and 64. These connectors 62 and 64 are generally tubular, and each tubular connector 62 includes a transverse opening 63 therethrough for retaining its companion connector 64.

As seen most clearly in FIG. 2 the tubular connector 64 extends through the transverse opening 63 in the other tubular connector 62. These tubular connectors are formed of flexible material such as rubber, tough plastic, and the like. They in effect serve as hinge connectors between the respective boom segments 60. The triangular arrangement of these boom segments 60 provides an overall stiffness to the grid structure 22 in the plane of each resultant equilateral triangle 65. In other words, this grid structure 22 acts as a truss for resisting lateral deflection or bending in the plane of the triangles 65 except to the extent that the flexible tubular connectors 62 and 64 may permit some flexibility. However, these hinged interconnections permits the grid structure 22 to deflect or bend readily in directions perpendicular to the planes of the successive equilateral triangles 65, thereby providing an articulated grid which can be heaved up and twisted in response to wave movements, as illustrated in FIGS. 1 and 3.

Boom segments 60 may be sealed containers having a gas therein or may contain floatable foam or other buoyant filler. Membranes 28 and 30 are preferably formed of tough, strong fabric, such as canvas but may be formed of strong plastic or the like. The membranes 28 and 30 extend down such that the line of keel weights 48 are positioned at depth in the range from approximately one and a half to approximately twice the horizontal distance between the grid support portions 36 and 42.

Figure 3:
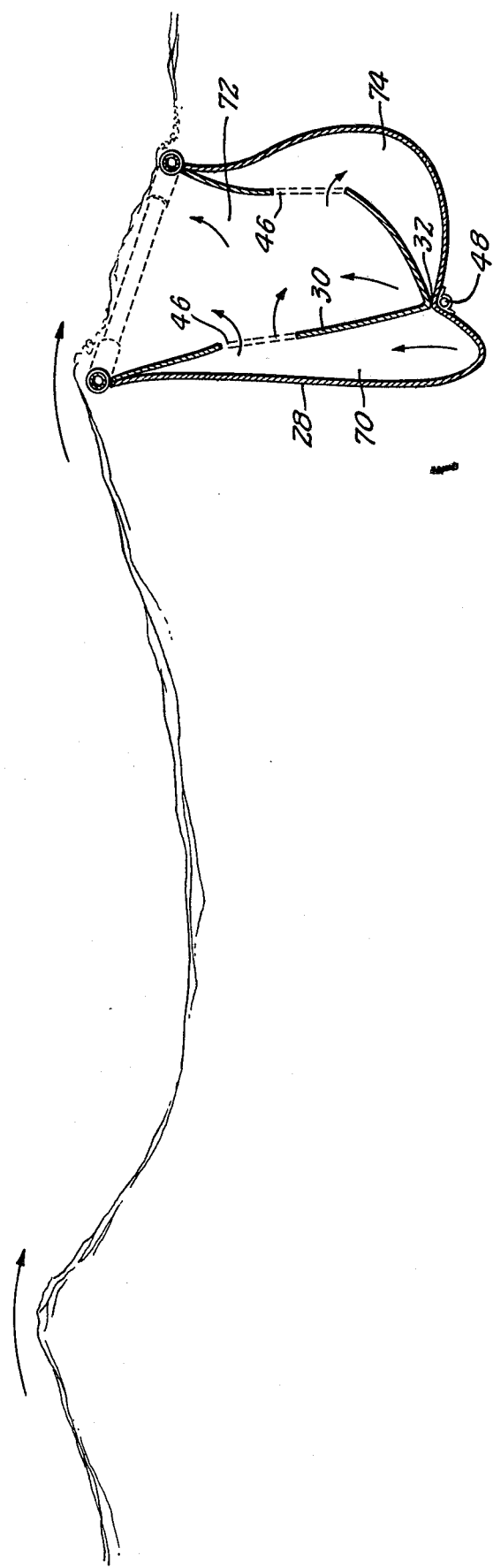
FIG. 3 is a sectional view of the breakwater of FIG. 1 demonstrating the effect of wave action on the breakwater.

The operation of the breakwater in dissipating wave energy can best be understood by reference to FIG. 3. With the floatable grid riding the waves, wave energy is dissipated as the breakwater, and thus the water therein, is lifted and churned by each wave. Due to the law of conservation of energy, as the potential energy of the breakwater and the water contained therein is increased by its elevation to a higher position, the kinetic energy at the source, that is of each wave, becomes decreased. The water lifted by the outer trough-like membrane 28 and by the inner V-shaped membrane 30 is surged and churned through the respective ports 46. Additional water may be poured from the crest of the dissipated wave down into the trough-like breakwater itself. When the breakwater returns again to its lower potential, the energy will not, for the most part, be returned to the original wave action but will be dissipated as thermal energy and as wave action across and against the wave motion.

As the grid flexes with wave action and one portion of the breakwater rises in potential with respect to another, fluid flow along the length of the breakwater is initiated. Again due to the conservation of energy, the wave energy is decreased by the kinetic energy of the fluid flow along the breakwater as well as by the thermal losses resulting from friction between the fluid and the membranes.

The present invention further utilizes the phenomenon that, due to thermal losses, a substantial amount of energy is extracted from a liquid as it passes through a restriction such as an orifice. When one support portion of the grid is raised above the other by the wave action as in FIG. 3, the volume of the region or space 70 between the outer and inner membrane components 28 and 30 is reduced, forcing water through port holes 46 in membrane 30 into the region or space 72 and then through other port holes 46 into the region or space 74. Hence, additional energy is absorbed as the water is churned back and forth through the apertures or port holes 46.

By virtue of the fact that the grid 22 is open, the breaking wave does not break completely over the breakwater but may break into it, as illustrated in FIG. 3. The water entering through the grid then forces water already in space 72 out through holes 46 into the spaces 70 and 74. Thus, water in all three spaces is forced toward the open ends of the breakwater. Because the energy required to move the water longitudinally along the length of the breakwater and to churn water through the holes 46 is taken from the wave, the wave energy is substantially dissipated.

The dimensions of the breakwater are of some importance. Because the breakwater is most efficient when it reaches below the elliptical motion of the water molecules comprising the wave into stable water, its depth should be at least approximately twice the height of the largest wave intended to be effectively intercepted. It is also important that the membrane support portions 36 and 42 extending along opposite sides of the grid structure be close enough to each other that they will both rise, i.e. become elevated, on the largest wave to be effectively encountered. If the grid were wider, water would be jostled from one space to another but, because one portion would be moving upward while another portion moves downward, there would be little overall lifting of the water enclosed by the breakwater; thus, energy dissipation due to the lifting phenomenon would be reduced. As larger waves are the most troublesome and damaging to shorelines, the dimensions of the breakwater should be set to make it most efficient for those waves.

Figure 5:
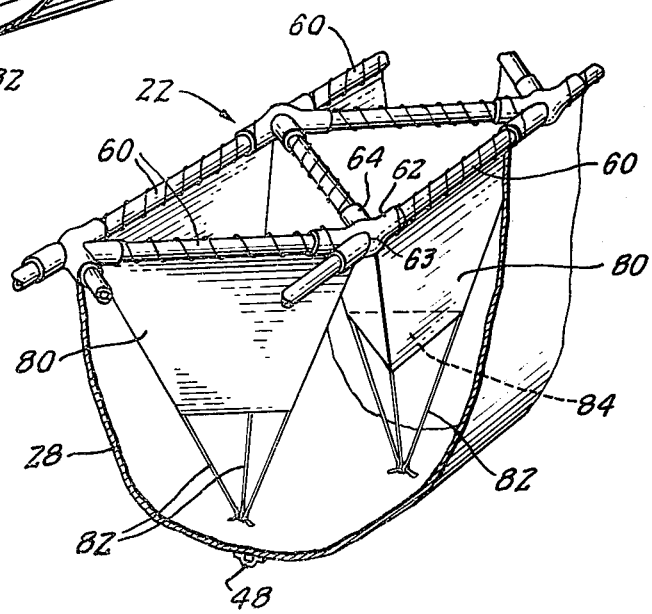
FIG. 5 is a perspective view, similar to FIG. 2, of the alternative embodiment of FIG. 4.
Figure 4:
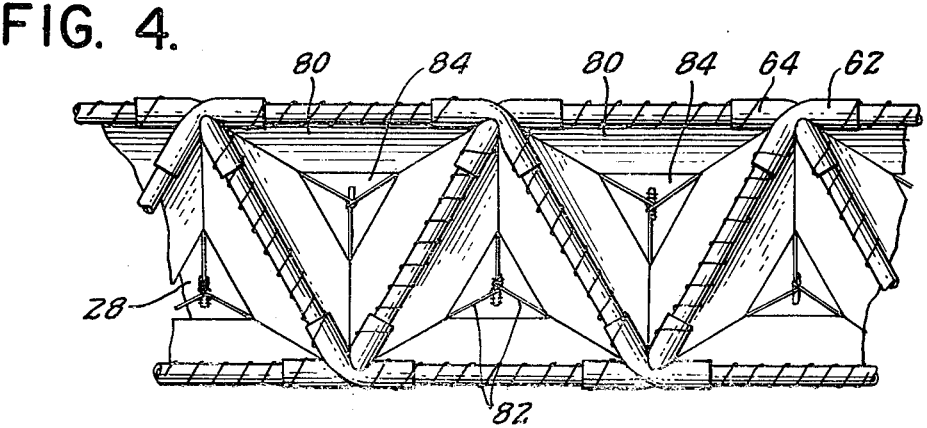
FIG. 4 is a plan view of an alternative embodiment of the invention in which the inner membrane components define truncated tetrahedral compartments.

An alternative embodiment of the breakwater is shown in FIGS. 4 and 5. In that embodiment, the second membrane components 80 are suspended below each equilateral triangle section of the grid. Each membrane component 80 defines a truncated tetrahedron converging downwardly when maintained taut by three lines 82 extending down as the apex of each tetrahedron. The port or aperture 84 formed at the bottom of each truncated tetrahedron serves the purpose of churning the water within the breakwater for dissipating energy. Water forced through ports 84 as the breakwater rises and falls will take energy from the wave as will water which breaks into the tetrahedron and flows through these ports. In other words, the water from the crests of waves breaking into the open grid structure 22 enters the open-top tetrahedral components 80 and funnels out of the ports 84.

This second embodiment as shown in FIGS. 4 and 5 also has the advantage that multiple flow paths are set up in and around and in between the respective tetrahedra resulting in multiple eddy currents which extract energy from the waves.

Another embodiment of the invention is shown in FIGS. 6–9. In this embodiment, the second membrane 30 is removed and a membrane or flexible sheet 90 is extended horizontally below the grid. Ports 92 are formed in this sheet 90 to permit waves to break into the breakwater. Because the second membrane 30 is not present in this embodiment to shape the first membrane 28, some alternative must be used if it is desired to hold the membrane 28 in a generally U-shaped configuration. For example, the membrane 28 may be shaped by stiffly flexible U-shaped ribs, such as wire ribs, sewn into pockets in the fabric.

Alternatively, the line of keel weights 48 may be permitted to pull the membrane 28 into a more generally V-shaped configuration than that shown in FIGS. 6 and 8.

In this final embodiment, the surface width of membrane 28 is less at one end 96 than at the other; thus, at one end the weights 48 will be held closer to grid 22 than at the other end. The incline in the trough formed by membrane 28 causes fluid flow in the direction indicated by arrows 94 as the breakwater rises and falls. As an alternative to the inclined trough or as an addition thereto, the end 96 of the trough is completely closed off by the end 97 or at least is substantially restricted by such an end closure.

As shown in FIG. 9, a turbine 99 is suspended in the water from buoys 98. The turbine is coupled in sealed fluid flow relationship to the end of the trough formed by membrane 28 by means of a funnel-shaped duct 100. Water flowing longitudinally through the breakwater trough due to wave action passes as shown by arrows 101 through the duct 100 and through the turbine 96 generating electrical power to be used elsewhere. The electrical power may be fed to shore through a flexible power cable 102. Thus this embodiment serves the dual purpose of breaking waves and generating power.

While the invention has been particularly shown and described with reference to preferred embodiments thereof, it will be understood by those skilled in the art that various changes in form and details may be made therein without departing from the spirit and scope of the invention as defined by the appended claims.

I claim:
1. A floatable breakwater for dissipating wave energy, said breakwater comprising:
   a floatable open grid structure defining first and second ends and first and second longitudinal membrane supports extending between the ends;
   a flexible membrane having first and second edges secured to said membrance supports with the width of said membrane between said edges being substantially greater than the lateral distance between said longitudinal membrane supports;
   means connected to said membrane for pulling the intermediate region of said membrane downwardly away from said open grid structure to thereby form a trough;
   a second flexible membrane between said open grid structure and said first flexible membrane, the second flexible membrane having first and second edges fixed to said membrane supports, the width of the second membrane between its edges being substantially greater than the distance between the membrane supports but less than the width of the first flexible membrane, said second flexible membrane being permeable to fluid flow;
   means fixing said second flexible membrane to said first flexible membrane at points between the edges of each of the flexible membranes, the points being positioned with respect to each other generally along a longitudinal line; and
   anchoring means for retaining said grid structure in a substantially fixed location in a body of water.

2. Floatable breakwater as claimed in claim 1 further comprising weight means for pulling said membranes away from said open grid, said weight means being fixed to the membranes generally along the longitudinal line defined by the points at which the second flexible membrane is fixed to the first flexible membrane.

3. The floatable breakwater as claimed in claim 1 wherein said grid structure comprises a plurality of linear members and a plurality of flexible connectors, said linear members being fixed end to end by said flexible connectors such that the linear members form a line of alternately inverted triangles.

4. The floatable breakwater as claimed in claim 3 wherein the triangles formed by said linear members are equilateral triangles.

5. The floatable breakwater as claimed in claim 3 wherein said connectors are flexible, tubular members.

6. The floatable breakwater as claimed in claim 1 wherein said means for pulling the membrane downwardly from the open grid structure comprises weights fixed to the membrane.

7. The floatable breakwater as claimed in claim 1 wherein said grid structure comprises a plurality of linear members and a plurality of flexible connectors, said linear members being fixed end to end by said flexible connectors such that the linear members form said grid structure of alternately inverted triangles.

8. The floatable breakwater as claimed in claim 7 wherein the triangles formed by said linear members are equilateral triangles.

9. The floatable breakwater as claimed in claim 7 wherein said connectors are flexible, tubular members.

10. The floatable breakwater as claimed in claim 1 further comprising means for closing one end of the trough formed by said first membrane.

11. The floatable breakwater as claimed in claim 1 wherein the width of said first membrane is greater at one end than at the other end, thereby forming an inclined trough.

12. A floatable breakwater as claimed in claim 1, in which:
   said second flexible membrane is generally V-shaped as seen by taking a cross section perpendicular to the longitudinal membrane supports, while said first flexible membrane as seen in said section is generally U-shaped.

13. A floatable breakwater as claimed in claim 1 in which:
   said second flexible membrane is perforated by a plurality of ports spaced longitudinally therealong, said ports being located laterally in said second membrane with respect to said longitudinal line.

14. A floatable breakwater as claimed in claim 1 in which:
   said first membrane is pulled downwardly by said pulling means to a depth which is in the range from approximately one and a half to approximately twice the horizontal distance between the longitudinal membrane supports.

15. A floatable breakwater for dissipating fluid wave energy, said breakwater comprising:
   a floatable open grid structure defining first and second ends and first and second longitudinal membrane supports extending between the ends, said grid structure comprising a plurality of linear members and a plurality of flexible connectors, said linear members being fixed end to end by said flexible connectors such that said linear members form a line of alternately inverted triangles;
   a first flexible membrane having first and second edges fixed to said membrane supports, the width of said first membrane between said edges being substantially greater than the distance between said membrane supports;

a second flexible membrane between said open grid structure and said first flexible membrane having first and second edges fixed to said membrane supports, the width of said second membrane between its edges being substantially greater than the distance between the membrane supports but less than the width of the first flexible membrane, said second flexible membrane being permeable to fluid flow;

means fixing said second flexible membrane to said first flexible membrane at points between the edges of each of the flexible membranes, the points being positioned with respect to each other generally along a longitudinal line;

weight means for pulling said membrane away from said open grid, said weight means being fixed to said membranes generally along the longitudinal line defined by the points at which the second flexible membrane is fixed to the first flexible membrane;

anchoring means for retaining said grid structure in a substantially fixed location in the fluid.

16. A portable breakwater for dissipating water wave energy, said breakwater comprising:

a floatable structure defining first and second ends and first and second longitudinal membrane supports extending between the ends;

a first flexible membrane having first and second edges fixed to said respective membrane supports, the width of said first membrane between said edges being substantially greater than the distance between said membrane supports;

weight means connected to an intermediate region of said first membrane for pulling said membrane downwardly away from said floatable structure for forming a trough;

a second flexible membrane positioned between said floatable structure and said first flexible membrane, said second flexible membrane having first and second edges fixed to said respective membrane supports, the width of said second membrane between its edges being substantially greater than the distance between the membrane supports but less than the width of the first flexible membrane, said second flexible membrane being permeable to fluid flow; and anchoring means for retaining said floatable structure in a substantially fixed location in a body of water.

17. The floatable breakwater as claimed in claim 16, further comprising:

means connecting said second flexible membrane to said first flexible membrane at points between the edges of each of the flexible membranes, the points being positioned with respect to each other generally along a longitudinal line; and said weight means for pulling said first membrane downwardly away from said floatable structure being fixed to said first membrane generally along the longitudinal line defined by the points at which the second flexible membrane is connected to the first flexible membrane.

18. A floatable breakwater for dissipating wave energy, said breakwater comprising:

a floatable open grid structure defining first and second ends and first and second longitudinal membrane supports extending between the ends;

a first flexible membrane having first and second edges secured to said membrane supports with the width of said membrane between said edges being substantially greater than the lateral distance between said longitudinal membrane supports;

means connected to said membrane for pulling the intermediate region of said membrane downwardly away from said open grid structure to thereby form a trough;

said grid structure including a plurality of elongated boom members interconnected end-to-end by connectors permitting said grid structure to flex at said connectors;

said booms defining a plurality of alternately inverted triangular boom configurations in said grid structure;

a plurality of second flexible membrane components each formed into an inverted three-sided pyramid shape and each having its upper edges secured to a respective one of said triangular boom configurations;

said inverted pyramid-shaped membrane components being open at their lower end; and means attaching the lower ends of said inverted pyramid-shaped membrane components to said first flexible membrane at points between the edges thereof.

19. A floatable breakwater for dissipating wave energy as claimed in claim 18, in which:

said triangular beam configurations are equilateral triangles; and said inverted three-sided pyramids are tetrahedral in configuration.

* * * * *